United States Patent
Terry et al.

(10) Patent No.: US 11,607,715 B2
(45) Date of Patent: Mar. 21, 2023

(54) SURFACE CLEANING TOOL

(71) Applicant: Techtronic Cordless GP, Anderson, SC (US)

(72) Inventors: Kevin Terry, Charlotte, NC (US); Steven Martise, Gahanna, OH (US); Andrew Burleigh, Lancaster, OH (US)

(73) Assignee: Techtronic Floor Care Technology Limited, Tortola (VG)

( * ) Notice: Subject to any disclaimer, the term of this patent is extended or adjusted under 35 U.S.C. 154(b) by 150 days.

(21) Appl. No.: 17/308,596

(22) Filed: May 5, 2021

(65) Prior Publication Data

US 2021/0346918 A1    Nov. 11, 2021

Related U.S. Application Data

(60) Provisional application No. 63/020,339, filed on May 5, 2020.

(51) Int. Cl.
| | | |
|---|---|---|
| *B08B 3/04* | (2006.01) | |
| *B08B 1/00* | (2006.01) | |
| *F16K 15/02* | (2006.01) | |

(52) U.S. Cl.
CPC .............. *B08B 3/04* (2013.01); *B08B 1/002* (2013.01); *F16K 15/025* (2013.01)

(58) Field of Classification Search
None
See application file for complete search history.

(56) References Cited

U.S. PATENT DOCUMENTS

| 3,943,591 | A  | 3/1976 | Lanusse |
| 6,981,291 | B2 | 1/2006 | McKay |
| 7,363,673 | B2 | 4/2008 | Schonewille et al. |
| 7,395,574 | B2 | 7/2008 | McKay |
| 7,707,674 | B2 | 5/2010 | Schonewille et al. |
| 8,088,085 | B2 | 1/2012 | Thiebaut et al. |
| 2008/0098547 | A1 | 5/2008 | McKey |
| 2008/0155769 | A1 | 7/2008 | Schonewille et al. |

FOREIGN PATENT DOCUMENTS

| CN | 207202818 U | 4/2018 |
| WO | 2014096313 A1 | 6/2014 |

OTHER PUBLICATIONS

International Search Report and Written Opinion for Application No. PCT/US2021/030853 dated Aug. 18, 2021 (12 pages).

*Primary Examiner* — Rita P Adhlakha
(74) *Attorney, Agent, or Firm* — Michael Best & Friedrich LLP

(57) ABSTRACT

A surface cleaning tool including a housing forming a handle, a motor, a fluid reservoir coupled to the motor for rotational movement, a cleaning head coupled to and rotatable with the fluid reservoir, and a valve configured to control the flow of fluid from the fluid reservoir to the cleaning head. The valve is actuated by movement of the fluid reservoir from a first position to a second position relative to the cleaning head.

18 Claims, 11 Drawing Sheets

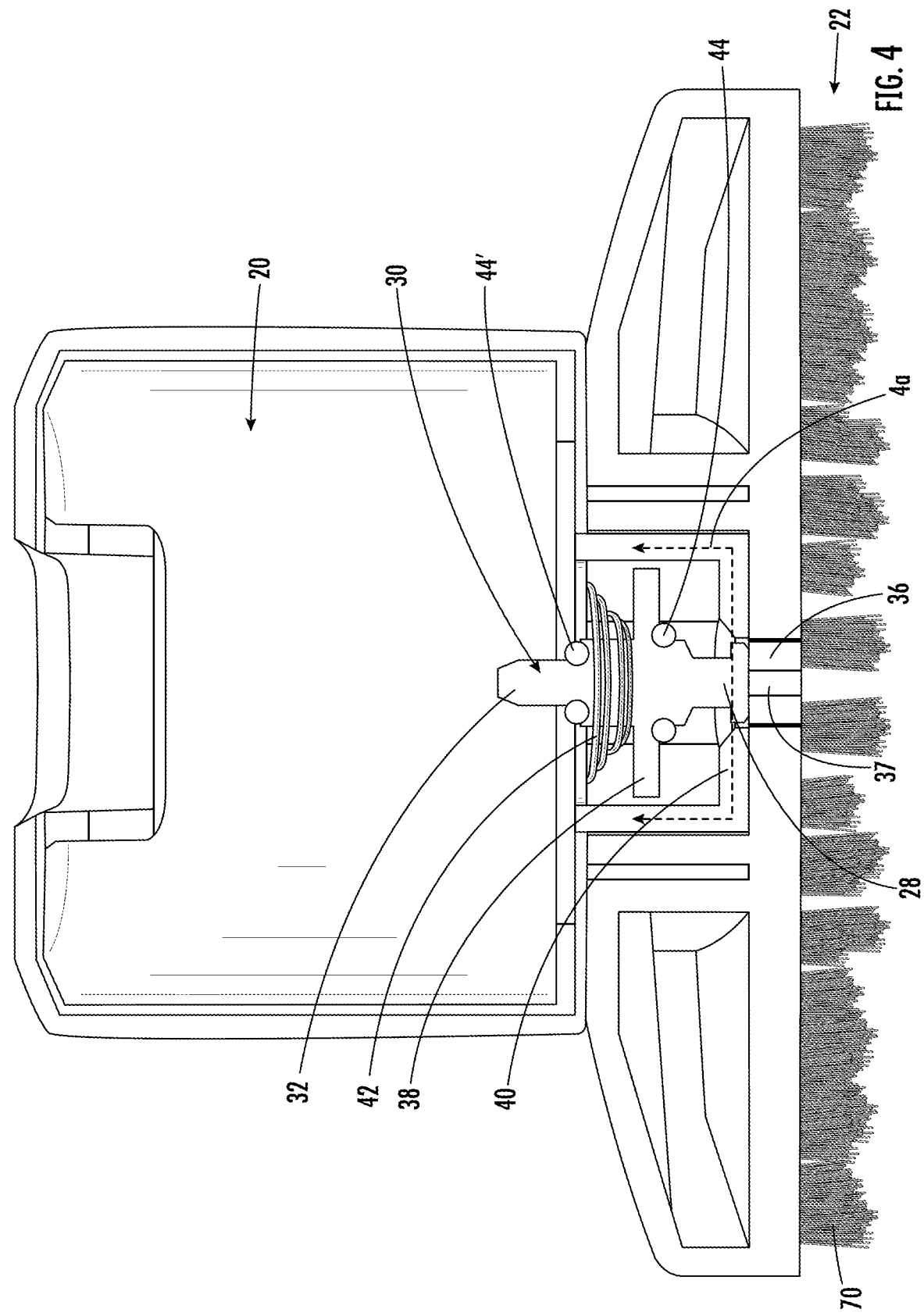

SURFACE CLEANING TOOL

CROSS-REFERENCE TO RELATED APPLICATIONS

This application claims priority to U.S. Provisional Patent Application No. 63/020,339, filed May 5, 2020, the entire contents of which are hereby incorporated by reference herein.

BACKGROUND

The present invention relates to surface cleaning tools.

SUMMARY

In one embodiment a surface cleaning tool is disclosed including a housing forming a handle, a motor located in the housing, a fluid reservoir coupled to the motor for rotational movement relative to the handle about an axis of rotation, a cleaning head coupled to and rotatable with the fluid reservoir relative to the handle about the axis of rotation in response to operation of the motor, and a valve configured to control a flow of fluid from the fluid reservoir to the cleaning head. The fluid reservoir moves relative to the cleaning head between a first position and a second position. The valve is actuated by movement of the fluid reservoir from the first position to the second position to dispense fluid.

Other aspects of the invention will become apparent by consideration of the detailed description and accompanying drawings.

BRIEF DESCRIPTION OF THE DRAWINGS

FIG. 4 is a cross-sectional view of the fluid reservoir and the cleaning head of FIG. 2 in a second position.

Figure 1:
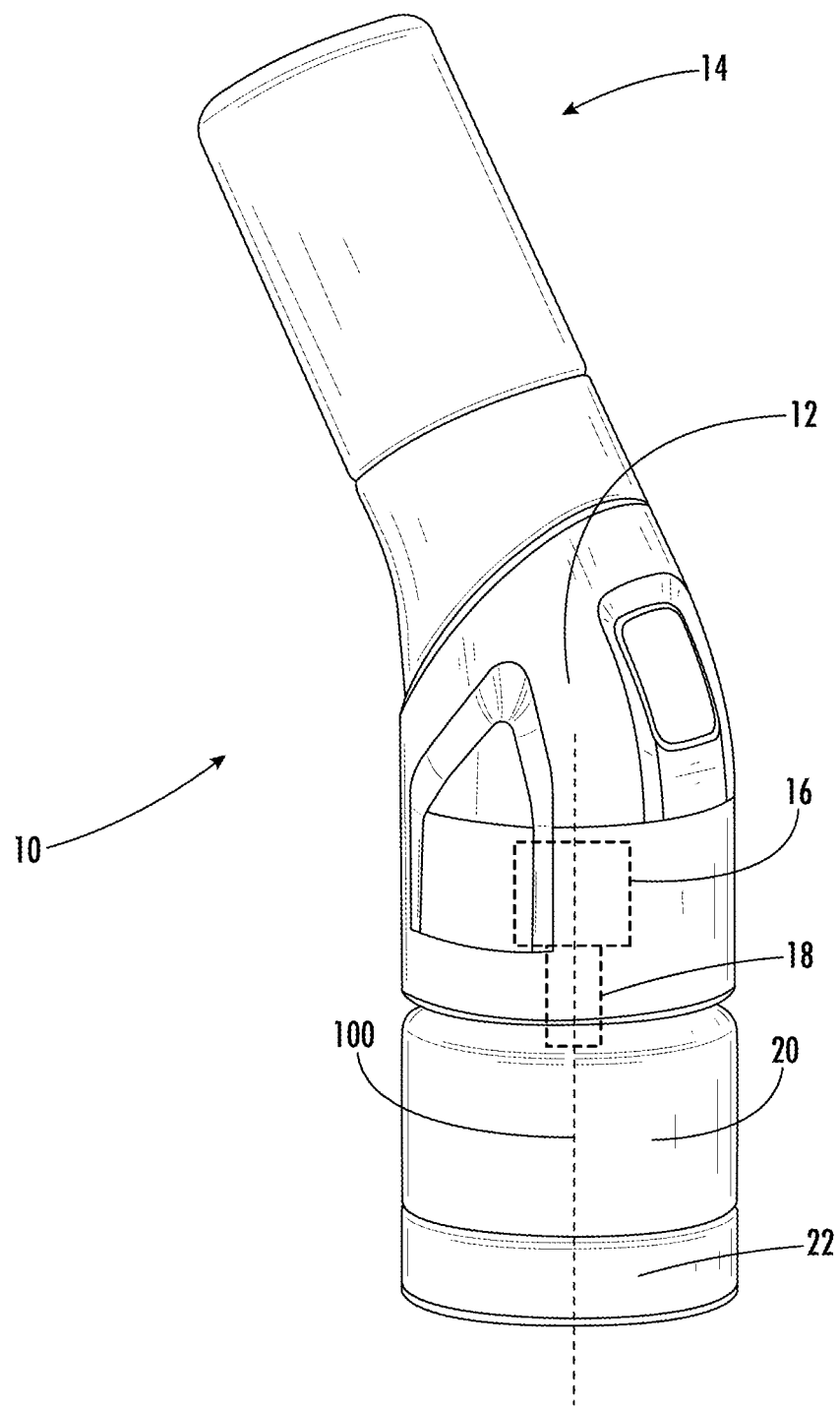
FIG. 1 is a perspective view of a surface cleaning tool according to one embodiment.
Figure 2:
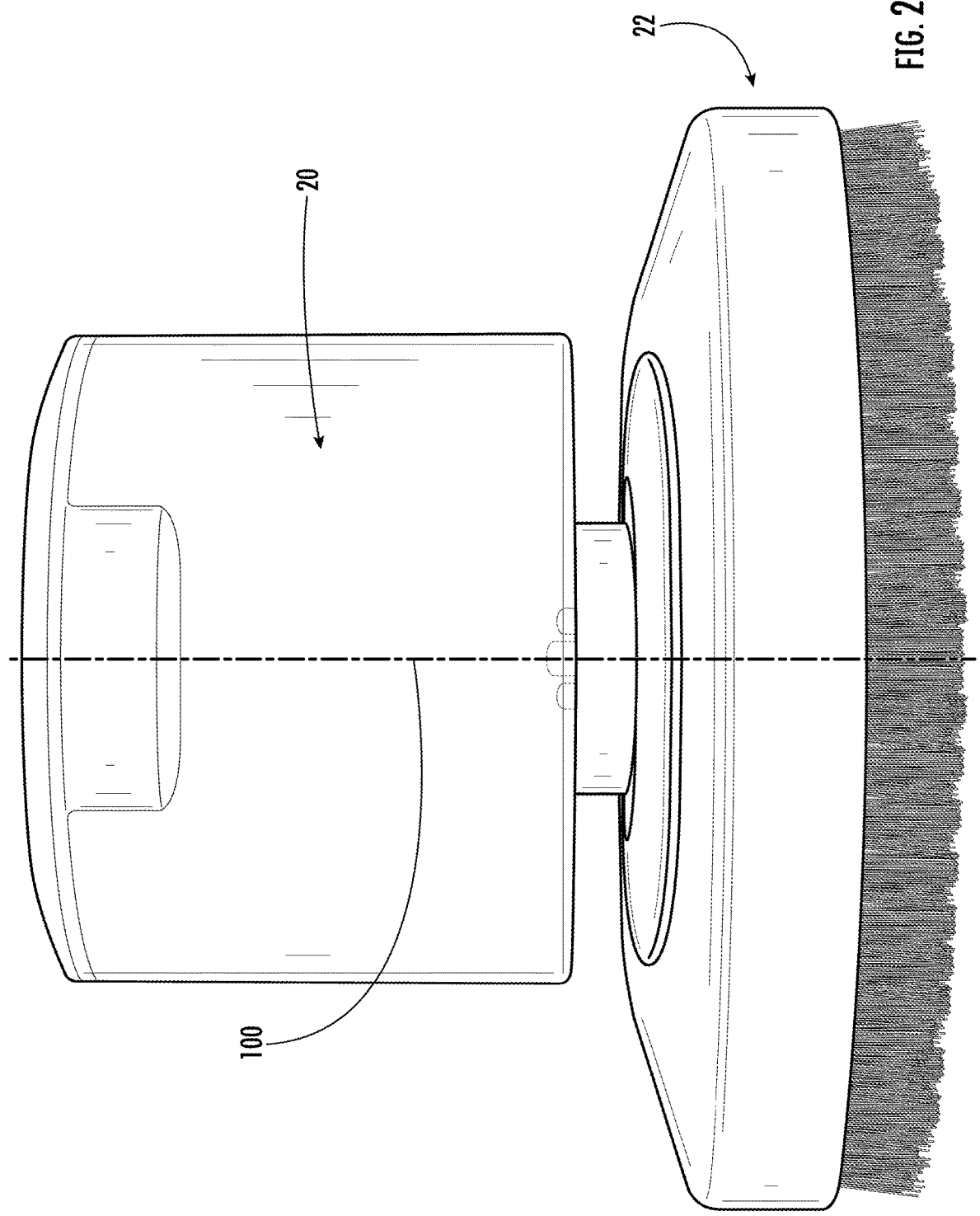
FIG. 2 is a view of a fluid reservoir and a cleaning head of a surface cleaning tool in a removed position, according to one embodiment.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

The disclosure relates to a surface cleaning tool 10 including a housing 12 having a handle 14, a motor 16 located in the housing 12, a drive shaft 18 rotated by the motor 16, a fluid reservoir 20, and a cleaning head 22. The fluid reservoir 20 is coupled to the drive shaft 18 for rotational movement with the drive shaft 18 about an axis of rotation 100. The cleaning head 22 is coupled to the fluid reservoir 20 and rotates with the fluid reservoir 20 about the axis of rotation 100. The fluid reservoir 20 and housing 12 are configured for axial movement relative to the cleaning head 22, movable along the axis of rotation 100 between a first position (FIGS. 3, 6, 8, and 10) and a second position (FIGS. 4, 5, 7, and 9). As discussed further below, the cleaning head 22 is configured to actuate a valve assembly 30 to allow fluid to flow from the valve assembly 30. When the fluid reservoir 20 is in the first position, the cleaning head 22 and fluid reservoir 20 are spaced apart by a spring 42 (FIGS. 3 and 6) and the valve assembly 30 is closed inhibiting fluid flow. As the fluid reservoir 20 and cleaning head 22 are pressed toward one another against the force of the spring 42 toward the second position, the spring 42 is compressed and fluid is distributed from the valve assembly 30.

Figure 6:
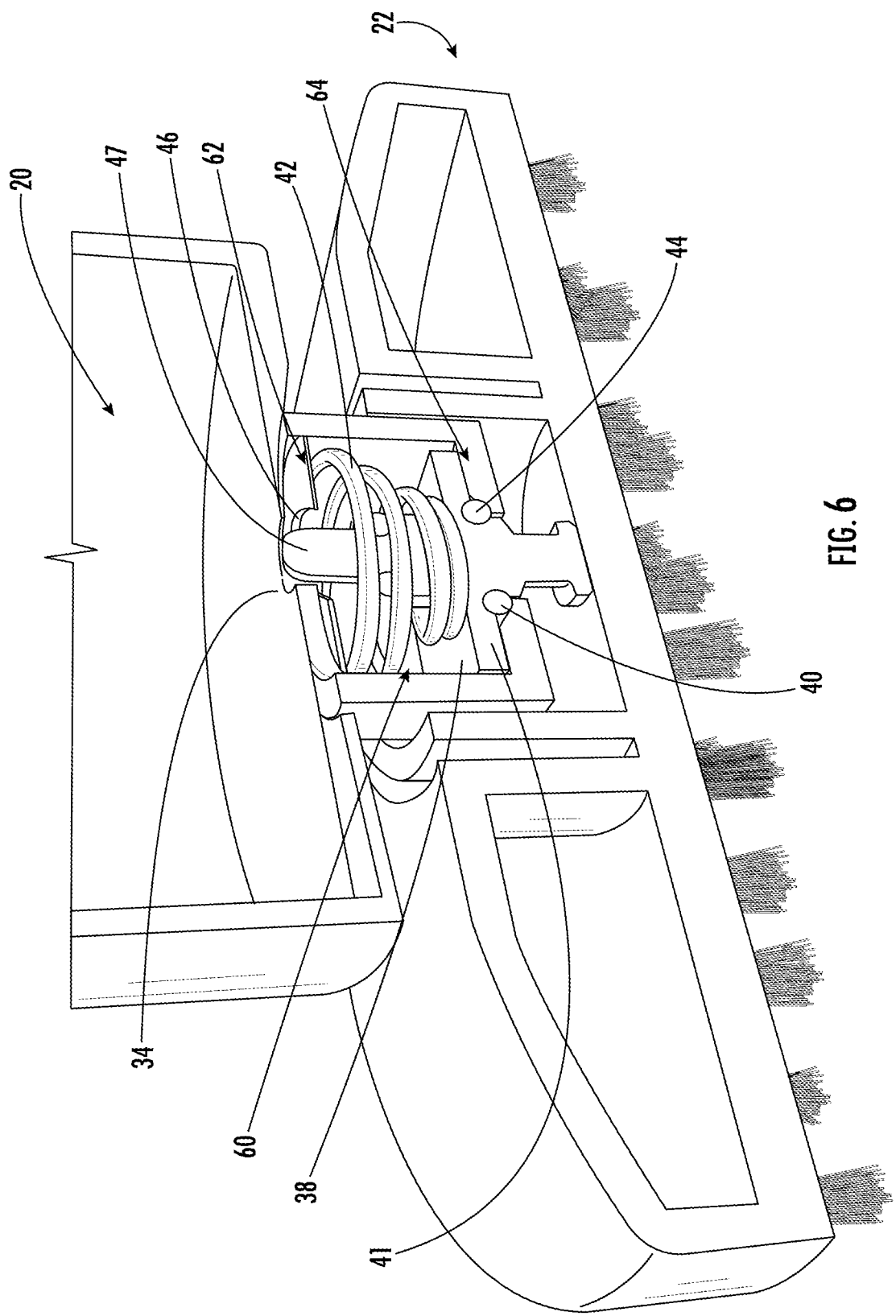
FIG. 6 is a detailed perspective cross-sectional view of the fluid reservoir and the cleaning head of FIG. 2 in the first position.
Figure 7:
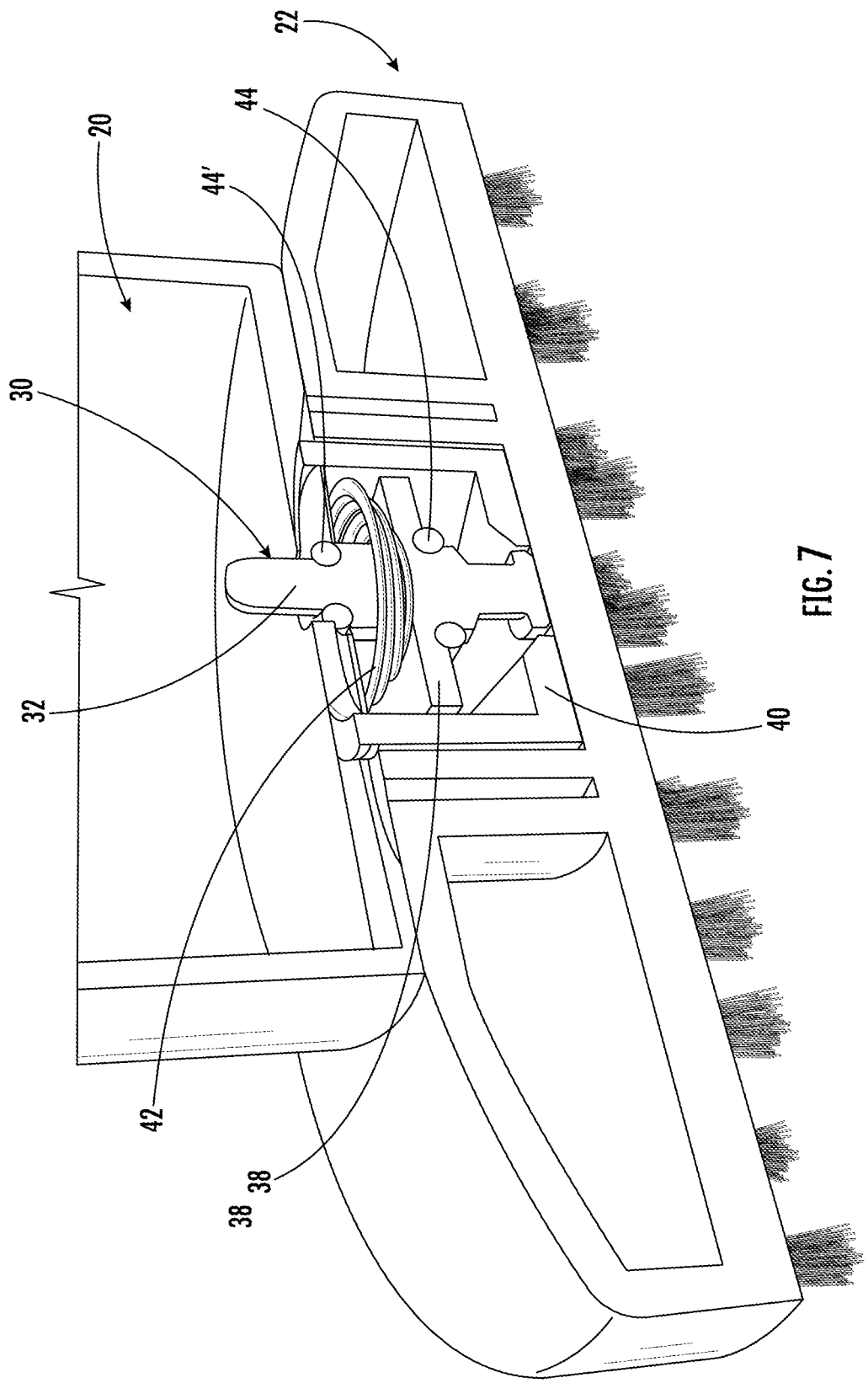
FIG. 7 is a detailed perspective cross-sectional view of the fluid reservoir and the cleaning head of FIG. 2 in the second position.
Figure 8:
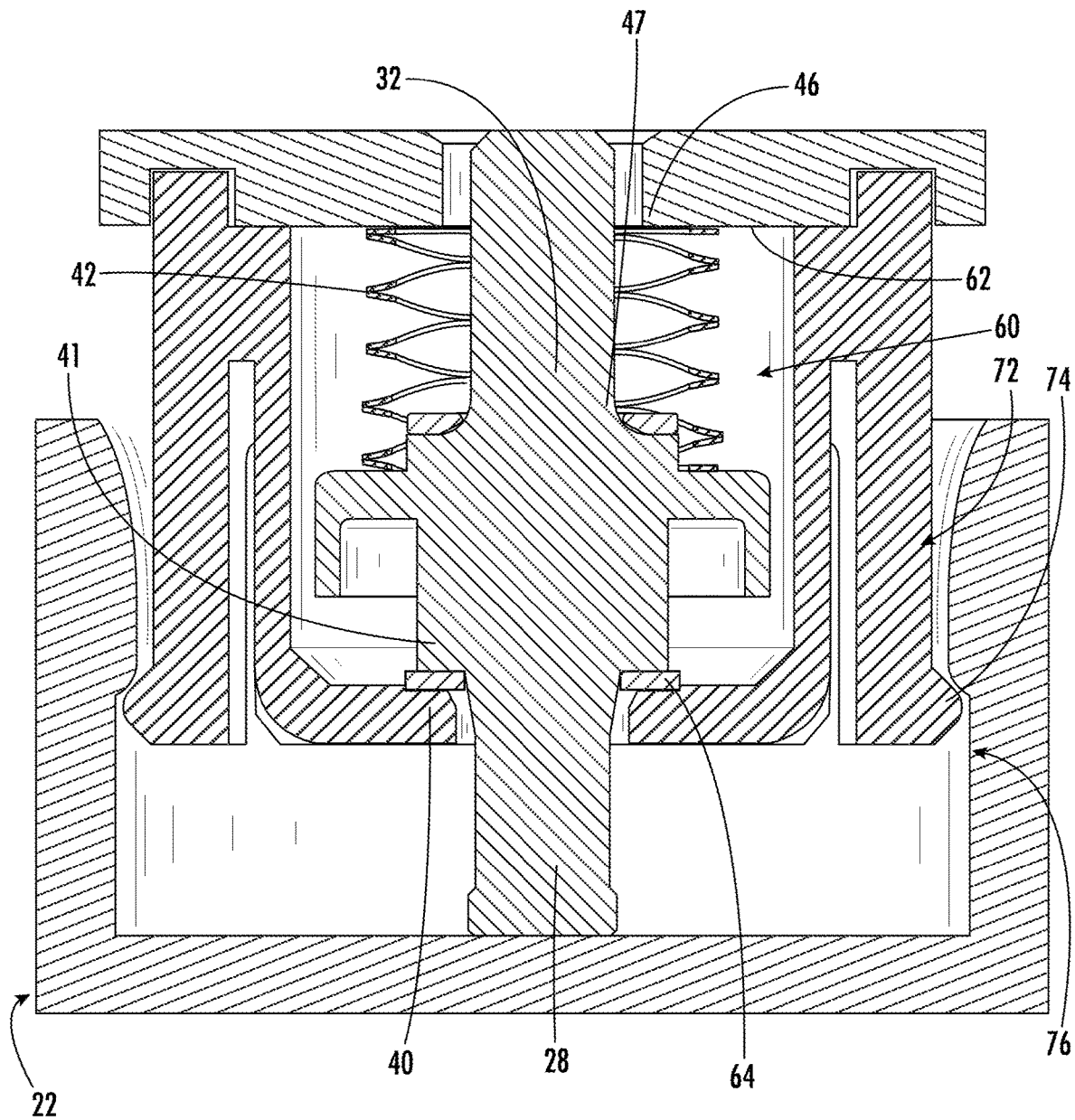
FIG. 8 is a detailed cross-sectional view of an alternate fluid reservoir and cleaning head assembly in a first position.

The valve assembly 30 is positioned between the fluid reservoir 20 and the cleaning head 22. The valve assembly 30 is configured to allow and regulate fluid flow from the fluid reservoir 20 to the cleaning head 22. With reference to FIGS. 6 and 8, the valve assembly 30 includes a valve chamber 60, with an upper chamber surface 62 and a lower chamber surface 64. The valve chamber 60 is filled with fluid from the fluid reservoir 20 and emptied of fluid toward the cleaning head 22. In the illustrated embodiment, the valve chamber 60 is connected to and movable with the fluid reservoir 20 relative to the cleaning head 22. The valve chamber 60 is affixed to the fluid reservoir 20, for example, by an adhesive or by ultrasonic welding. The valve chamber 60 is sized to contain a single application of fluid that is dispensed through the valve 30 when the fluid reservoir 20 and the cleaning head 22 are pressed toward one another to the fluid reservoir second position, such as in a cleaning operation when a user presses the handle 14 applying pressure on the cleaning head 22 against the surface, the applied pressure on the handle 14 moving the housing 12 and fluid reservoir 20 together toward the cleaning head 22 to the second position dispensing the fluid. The valve 30 is actuated by movement of the fluid reservoir 20 toward and away from the cleaning head 22, between the first position and the second position, or conversely, movement of the cleaning head 22 toward and away from the fluid reservoir. The user applied pressure on the handle 14 moves the valve chamber 60 against the force of the spring 42 toward the cleaning head 22, opening the valve. When the user applied pressure is removed, the spring 42 presses the fluid reservoir 20 and valve chamber 60 away from the cleaning head to the first position.

The valve 30 includes an inlet 34 in fluid communication with the fluid reservoir 20 and an outlet 36 in fluid communication with the cleaning head 22. The valve chamber 60 connects the inlet 34 and the outlet 36. The valve assembly 30 includes the valve chamber 60, a valve piston 32, an inlet valve seat 46 in communication with the inlet 34, an outlet valve seat 40 in communication with the outlet 36, and the spring 42. The valve piston 32 is positioned within the valve chamber 60, and the valve chamber 60 moves axially relative to the valve piston 32 to open and close the valve. The valve piston 32 includes an outlet shutoff 41 configured to engage and close the outlet valve seat 40 to inhibit fluid flow from the valve chamber outlet 36 to the cleaning head 22 when the fluid reservoir 20 is in the first position. The valve piston 32 further includes an inlet shutoff 47 configured to engage and close the inlet valve seat 46 to inhibit fluid flow from the fluid reservoir 20 to the valve chamber 60 when the fluid reservoir 20 is in the second position. The inlet shutoff 47 ensures that only a single application of fluid is dispensed to the cleaning head 22 in the second position. The inlet shutoff 47 is configured to be spaced from the inlet valve seat 46, thus opening the valve allowing fluid flow from the fluid reservoir 20 to the valve chamber 60 in the first position. In the second position, the outlet shutoff 41 opens the outlet valve seat 40 to allow fluid flow from the valve chamber 60 to the cleaning head 22. In one embodiment, the outlet valve seat 40 and the inlet valve seat 46 may include o-rings or gaskets 44 and 44' to facilitate closing of the outlet valve seat 40 and the inlet valve seat 46, respectively.

The valve piston 32 includes a flange 38 positioned around the valve piston 32 forming a spring seat facing the upper chamber surface 62. The flange 38 is located axially between the inlet 34 and the outlet 36, with the inlet 34 being above the flange 38 and the outlet 36 being below the flange 38 in a use position. In one embodiment, the inlet 34 and the outlet 36 are coaxial along the axis of rotation 100. The axial distance between inlet 34 and the outlet 36 is greater than the axial distance between the inlet shutoff 47 and the outlet shutoff 41, the difference in distance being the travel length between the first and second position. The spring 42 is positioned in the valve chamber 60 between the upper chamber surface 62 and the flange 38, pressing the valve piston 32 and outlet shutoff 41 toward the outlet valve seat 40. The piston 32 includes an actuator stem 28 extending axially away from the outlet shutoff 41, configured to extend through the outlet valve seat 40 toward the cleaning head 22 such that pressing the cleaning head 22 actuates the valve by pressing the actuator stem 28. In the illustrated embodiment, the actuator stem 28 is configured to contact the cleaning head 22 and remain in axial position relative to the cleaning head 22 while the valve chamber 60 moves axially relative to the valve piston 32. In response to actuation, the lower chamber surface 64 and outlet valve seat 40 move away from the outlet shutoff 41 and flange 38 and toward the cleaning head 22, and the upper chamber surface 62 compresses the spring 42 against the flange 38, pressing the actuator stem 28 against the cleaning head 22. Stated another way, the cleaning head 22 retains the valve piston 32 in axial position and movement of the valve chamber 60 toward the cleaning head 22 releases the outlet shutoff 41 from the outlet valve seat 40. In this embodiment, the flange 38 functions as a spring seat. The flange 38 further functions to move fluid out of the valve chamber 60 as the fluid reservoir 20 moves to the second position, and to draw fluid into the valve chamber 60 as the fluid reservoir 30 moves to the first position.

In the illustrated embodiment, the valve is a momentary valve 30 actuated when the fluid reservoir 20 is moved from the first position (FIGS. 3 and 6) to the second position (FIGS. 4, 5, and 7), such as the user providing a pressing force against the handle 14 pushing the fluid reservoir 20 toward the cleaning head 22. In the first position, the inlet shutoff 47 is spaced from the inlet valve seat 46 and fluid is able to flow from the fluid reservoir 20 into the valve chamber 60 through the inlet 34. The valve chamber 60 is sized to contain one application of fluid for cleaning. Additionally, in the first position, the spring 42 presses the outlet shutoff 41 against the outlet valve seat 40 to inhibit fluid flow from the valve. In the second position, the outlet shutoff 41 is spaced from the outlet valve seat 40 opening the outlet 36 enabling the fluid collected in the valve chamber 60 to be dispensed to the cleaning head 22 through the outlet 36. Additionally in the second position, the inlet shutoff 47 engages and closes the inlet valve seat 46 to inhibit fluid flow through the inlet 34 and into the valve chamber 60, inhibiting an excess flow of fluid in the second position. The spring 42 is provided between the flange 38 and the upper chamber surface 62 to press the valve chamber 60 and fluid reservoir 20 away from the cleaning head 22 to the first position in the absence of user applied force. The user applying a downward force to the reservoir tank 20 starts fluid flow by moving the lower chamber surface 62 and the outlet valve seat 40 away from the outlet shut off 41, allowing fluid flow to the cleaning head 22. In one embodiment, the downward force opening the valve 30 is applied by the user pressing the cleaning head 22 against a surface to be cleaned. When the force is removed, such as when the user lifts the surface cleaning tool 10 away from the surface to be cleaned, the spring force causes the lower chamber surface 64 and the outlet valve seat 40 to move upward to close the outlet shut off 41 and stop fluid flow.

In summary, in the first position the inlet 34 is open and the outlet 36 is closed, and in the second position the inlet 34 is closed and the outlet 36 is open. There is an intermediate position when the fluid reservoir is moving from the first position to the second position where both the inlet 34 and outlet 36 are partially open. The user could potentially use the surface cleaning tool 10 in this intermediate position in order to have constant fluid flow, however the surface cleaning tool 10 is intended for use in the first position and the second position for optimal performance.

Figure 3:
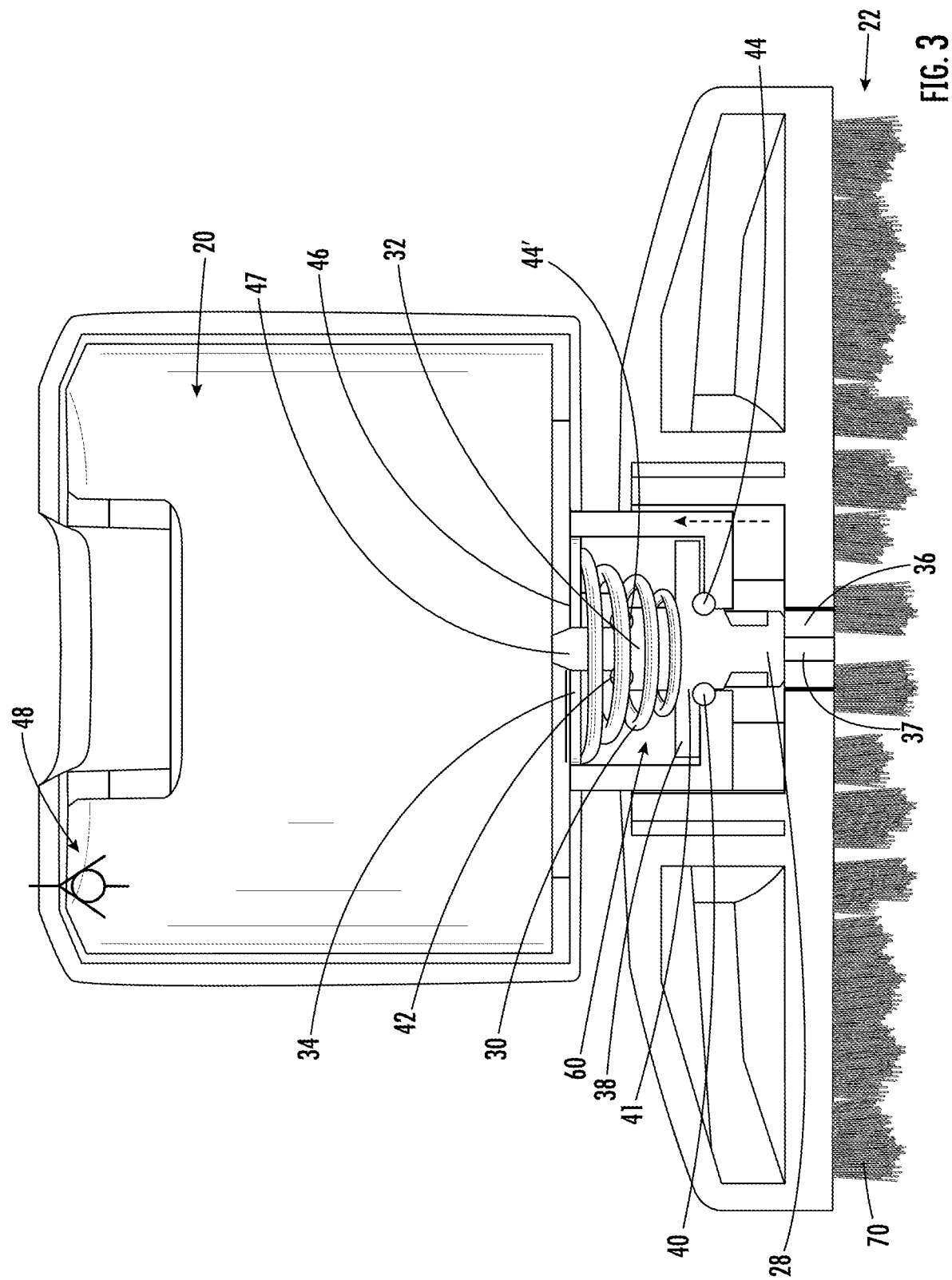
FIG. 3 is a cross-sectional view of the fluid reservoir and the cleaning head of FIG. 2 in a first position.

In the embodiment illustrated in FIG. 3, the reservoir tank 20 includes a check valve 48 (shown schematically) that permits air to enter the fluid reservoir 20 as fluid flows from the fluid reservoir 20 through the inlet 34 into the valve chamber 60, assisting in the fluid reservoir 20 returning to the first position from the second position.

The size of the valve chamber 60 is configured to fill with a predetermined amount of cleaning fluid from the fluid reservoir 20 through the inlet 34 when the fluid reservoir 20 is in the first position and the inlet 34 is open. The valve chamber 60 then allows that predetermined amount of fluid to be dispensed through the outlet 36 to the cleaning head 22 when the surface cleaning tool 10 is moved to the second position. Closing the inlet 34 of the valve chamber 60 in the second position prevents continuous flow of fluid from the reservoir during operation so that the user does not over distribute cleaning fluid to the surface to be cleaned during use. In order to apply multiple applications of fluid to the surface to be cleaned, the user repeats the process of applying and removing pressure from the cleaning head 22 to move the fluid reservoir 20 between the first position and the second position. The valve chamber 60 refills with fluid through the inlet 34 in the first position and dispenses fluid through the outlet 36 in the second position.

Figure 4A:
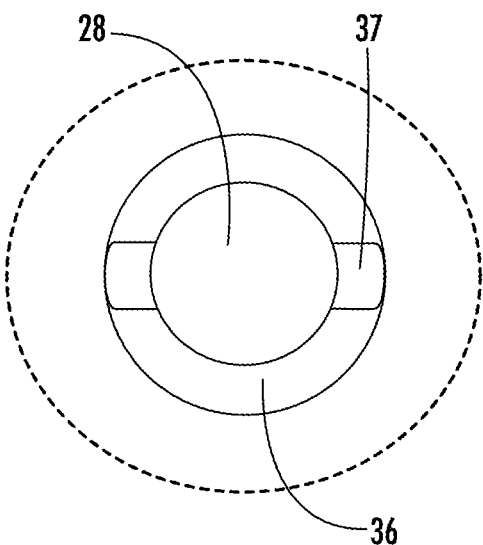
FIG. 4a is a detailed top cross-sectional view of the surface cleaning tool of FIG. 4.

In the embodiment shown in FIGS. 3, 4, and 4a there is a single outlet 36 adjacent the valve piston 32. In this arrangement, there is a support rib 37 bisecting the outlet 36 to support the actuator stem 28 of the valve piston 32. As illustrated in FIG. 4a, the diameter of the actuator stem 28 is less than the diameter of the outlet 36 such that the stem 28 does not inhibit fluid flow through the outlet 36. In the embodiment shown in FIG. 10, there are multiple outlets 36' configured to deliver solution across the cleaning head 22.

Figure 5:
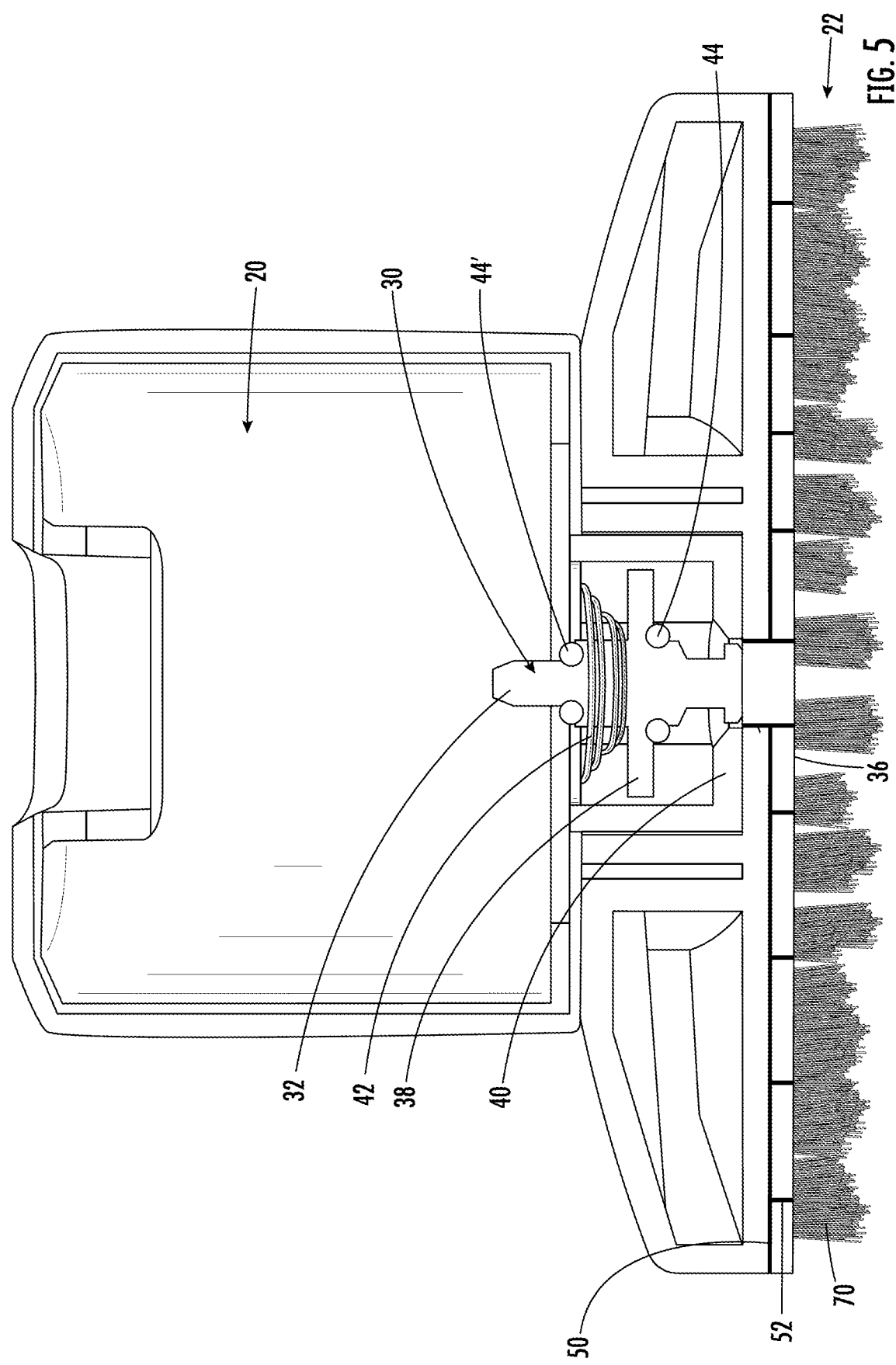
FIG. 5 is a cross-sectional view of the fluid reservoir and the cleaning head of FIG. 2 in a second position, according to one embodiment.

In the embodiment shown in FIG. 5, the cleaning head 22 includes a channel 50 from the outlet 36 to outer portions of the cleaning head 22. The channel 50 includes a plurality of apertures 52 to distribute fluid to the surface to be cleaned. The channel 50 is configured to receive the fluid being dispensed to the cleaning head 22 and distribute it evenly across the surface of the cleaning head 22 via the plurality of apertures 52. In one embodiment, the channel 50 is tapered such that the channel is larger at the outer portion and smaller as the channel approaches the outlet 36. In one embodiment, the channel is formed by a secondary drilling process. This allows the fluid to more easily reach the outer portion, with less fluid immediately entering the proximate apertures. This enables even fluid distribution across the cleaning head 22 and even cleaning across the surface.

Figure 9:
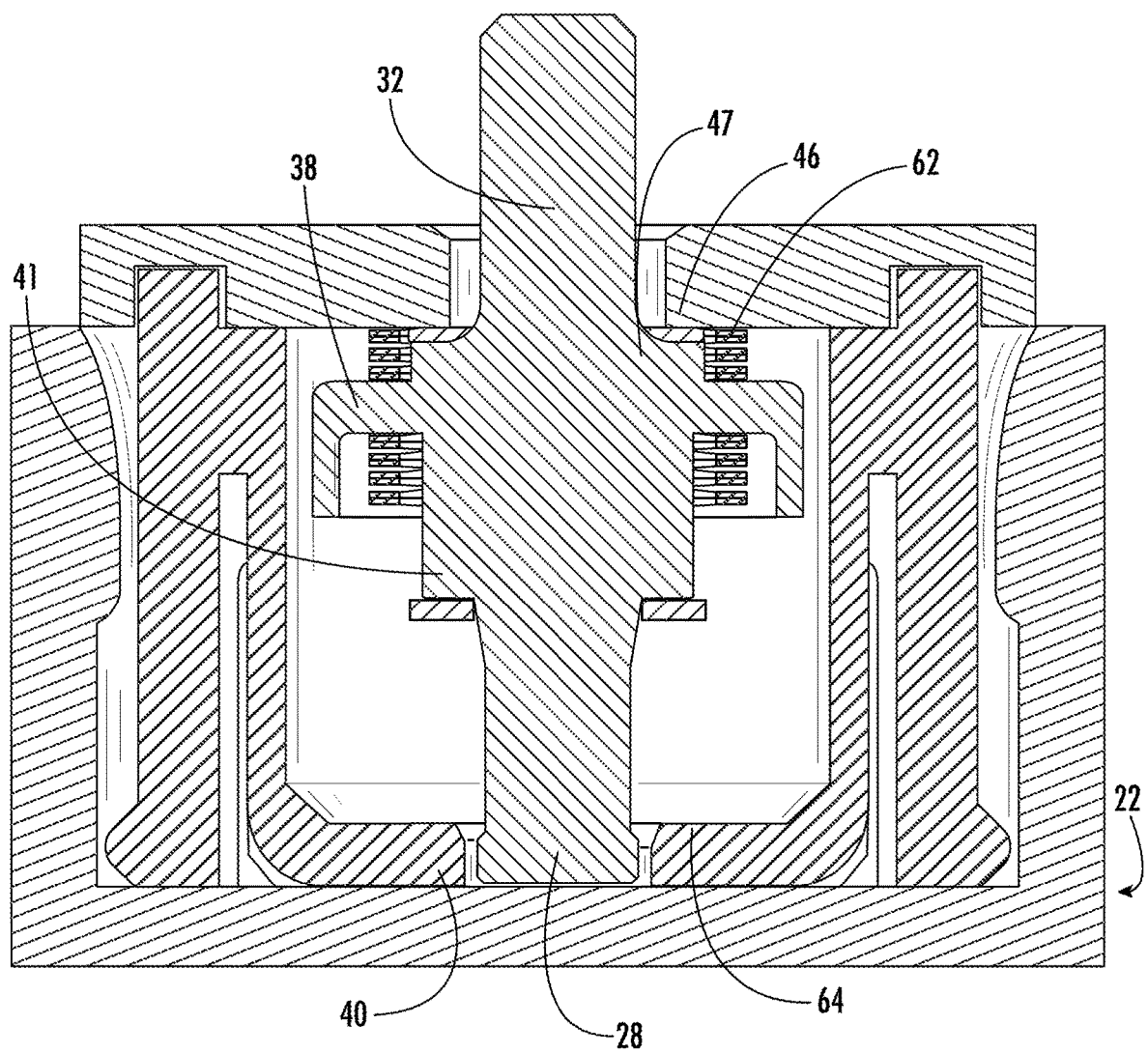
FIG. 9 is a detailed cross-sectional view of the fluid reservoir and cleaning head of FIG. 8 in a second position.
Figure 10:
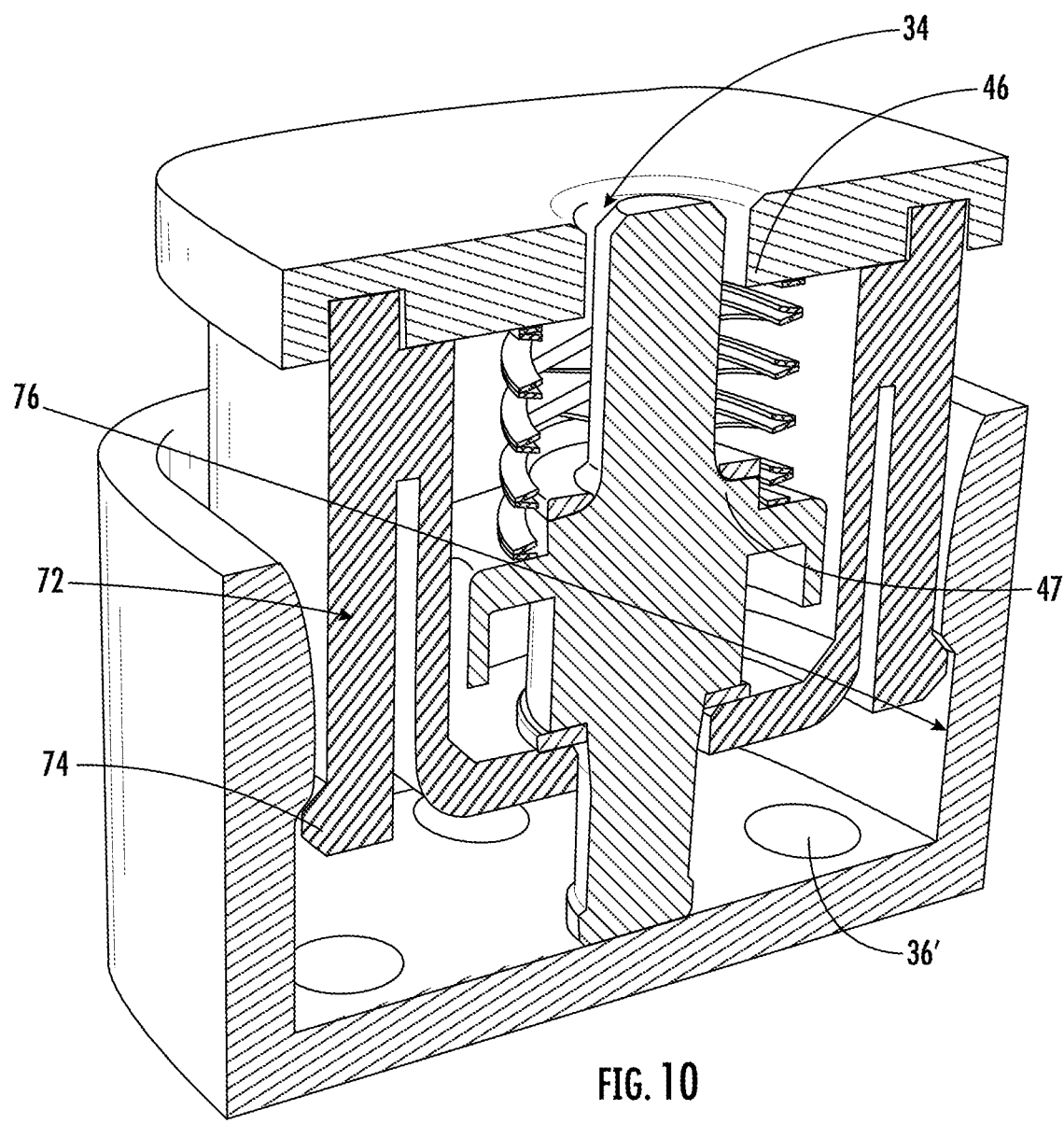
FIG. 10 is a detailed perspective cross-sectional view of the fluid reservoir and cleaning head of FIG. 8 in the first position.

In the embodiments illustrated in FIGS. 8-10, the fluid reservoir 20 includes a resilient latch member 72 configured to interlock with a corresponding feature on the cleaning head 22 to secure the fluid reservoir 20 to the cleaning head 22. In the illustrated embodiment, the latch member 72 includes a tab or protrusion 74, and the cleaning head 22 includes a corresponding undercut or groove 76 that receives and retains the protrusion 74. The shape of the protrusion 74 and groove 76 may be configured such that the interlock is releasable by a user pulling the cleaning head axially away from fluid reservoir. The groove 76 allows the protrusion 74 and the fluid reservoir 20 to move axially between the first position (FIG. 8) and the second position (FIG. 9), but limits rotational movement that would dislodge the cleaning head 22 from the fluid reservoir 20.

In one embodiment, the cleaning head 20 can be interchanged with other cleaning and/or scrubbing heads. Each alternate cleaning head is coupleable to the fluid reservoir 20. In the illustrated embodiment, the cleaning head 22 is a brush with bristles 70 for scrubbing the surface to be cleaned. In various alternatives, the cleaning heads 20 can include bristles, microfiber or sponge pads, silicon features, or any suitable cleaning material. The interchangability allows the user to customize the surface cleaning cleaning tool 10 based on individual cleaning applications.

Various features and advantages of the invention are set forth in the following claims.

What is claimed is:

1. A surface cleaning tool comprising:
   a housing forming a handle;
   a motor located in the housing;
   a fluid reservoir coupled to the motor for rotational movement relative to the handle about an axis of rotation;
   a cleaning head coupled to and rotatable with the fluid reservoir relative to the handle about the axis of rotation in response to operation of the motor; and
   a valve configured to control a flow of fluid from the fluid reservoir to the cleaning head,
   wherein the fluid reservoir moves relative to the cleaning head between a first position and a second position, and wherein the valve is actuated by movement of the fluid reservoir from the first position to the second position to dispense fluid.

2. The surface cleaning tool of claim 1, wherein the valve includes
   an inlet in communication with the fluid reservoir,
   an outlet having an outlet valve seat, and
   an outlet shutoff facing the outlet valve seat,
   wherein the outlet shutoff engages the outlet valve seat closing the valve when the fluid reservoir is in the first position.

3. The surface cleaning tool of claim 2, wherein the valve further includes a spring pressing the outlet shutoff against the outlet valve seat when the fluid reservoir is in the first position.

4. The surface cleaning tool of claim 2, wherein movement of the fluid reservoir to the second position moves the outlet valve seat from the outlet shutoff, opening the valve.

5. The surface cleaning tool of claim 2, wherein
   the inlet includes an inlet valve seat, and
   the valve includes an inlet shutoff facing the inlet valve seat,
   wherein movement of the fluid reservoir to the second position engages the inlet shutoff against the inlet valve seat closing the inlet.

6. The surface cleaning tool of claim 5, wherein the valve include a valve piston positioned between the inlet and the outlet, wherein the valve piston includes the inlet shutoff facing the inlet and the outlet shutoff facing the outlet.

7. The surface cleaning tool of claim 6, wherein the inlet and the outlet are coaxial along the axis of rotation.

8. The surface cleaning tool of claim 2, wherein the valve piston further includes an actuator stem extending through the valve chamber outlet configured to contact the cleaning head and remain in axial position relative to the cleaning head when the valve chamber moves from the first position to the second position.

9. The surface cleaning tool of claim 2, wherein the valve chamber is coupled to and movable with the fluid reservoir.

10. The surface cleaning tool of claim 2, wherein
    the upper chamber surface includes a valve chamber inlet having an inlet valve seat, and
    the valve piston includes an inlet shutoff facing the upper chamber surface,
    wherein movement of the fluid reservoir to the second position engages the inlet shutoff against the inlet valve seat closing the valve chamber inlet.

11. The surface cleaning tool of claim 10, wherein the valve chamber inlet and valve chamber outlet are coaxial along the axis of rotation.

12. The surface cleaning tool of claim 2, wherein the valve chamber contains a single application of fluid.

13. The surface cleaning tool of claim 1, wherein the valve includes
    a valve chamber having an upper chamber surface and a valve chamber outlet, the valve chamber outlet having an outlet valve seat,
    a valve piston positioned within the valve chamber along the axis of rotation, the valve piston having a spring seat facing the upper chamber surface and an outlet shutoff facing the outlet valve seat, and
    a spring between the upper chamber surface and the spring seat pressing the outlet shutoff toward the outlet valve seat.

14. The surface cleaning tool of claim 1, wherein the cleaning head is removable from the fluid reservoir and is interchangeable with a second cleaning head.

15. The surface cleaning tool of claim 1, wherein the valve is actuated by movement of the fluid reservoir from the first position to the second position in response to a downward force applied to the handle by a user with the cleaning head against a surface to be cleaned.

16. The surface cleaning tool of claim 1, further comprising a battery located in the housing, wherein the battery is operably connected to the motor.

17. The surface cleaning tool of claim 1, wherein the fluid reservoir includes a check valve enabling air entry to the reservoir when fluid dispenses from the reservoir.

18. The surface cleaning tool of claim 1, wherein the fluid reservoir moves along the axis of rotation relative to the cleaning head between the first position and the second position.

* * * * *